United States Patent
Wang et al.

(10) Patent No.: US 8,329,071 B2
(45) Date of Patent: Dec. 11, 2012

(54) MULTICOMPONENT NANOPARTICLE MATERIALS AND PROCESS AND APPARATUS THEREFOR

(75) Inventors: Hai Wang, Arcadia, CA (US); Denis Phares, Pasadena, CA (US)

(73) Assignee: Hestia Tec, LLC, Pasadena, CA (US)

( * ) Notice: Subject to any disclaimer, the term of this patent is extended or adjusted under 35 U.S.C. 154(b) by 424 days.

(21) Appl. No.: 12/633,629

(22) Filed: Dec. 8, 2009

(65) Prior Publication Data
US 2010/0140560 A1   Jun. 10, 2010

Related U.S. Application Data (60) Provisional application No. 61/193,582, filed on Dec. 8, 2008.

(51) Int. Cl.
*B29B 9/00* (2006.01)

(52) U.S. Cl. ......... 264/6; 264/5; 264/7; 264/12; 264/13; 264/14; 252/182.1; 252/509; 252/521.2; 75/331; 75/338; 75/340; 75/341; 502/180; 423/179.5

(58) Field of Classification Search .................. 264/5, 6, 264/7, 12, 13, 14; 252/182.1, 509, 521.2; 75/331, 338, 340, 341; 502/180; 423/179.5
See application file for complete search history.

(56) References Cited

U.S. PATENT DOCUMENTS

| | | |
|---|---|---|
| 4,842,832 A | 6/1989 | Inoue et al. |
| 5,358,695 A | 10/1994 | Helble et al. |
| 5,447,708 A | 9/1995 | Helble et al. |
| 5,840,373 A | 11/1998 | Hahn et al. |
| 5,910,382 A | 6/1999 | Goodenough et al. |
| 5,958,348 A | 9/1999 | Bi et al. |
| 6,013,318 A | 1/2000 | Hunt et al. |
| 6,095,436 A | 8/2000 | Seegers et al. |
| 6,468,684 B1 | 10/2002 | Chisholm et al. |
| 6,514,640 B1 | 2/2003 | Armand et al. |
| 6,702,961 B2 | 3/2004 | Barker et al. |
| 6,777,374 B2 | 8/2004 | Sahle-Demessie et al. |

(Continued)

FOREIGN PATENT DOCUMENTS

CA     2395115     7/2001

(Continued)

OTHER PUBLICATIONS

Flame co-synthesis of LiMn2O4 and carbon nanocomposites for high power batteries, Patey et al., Journal of Power Sources, 189, 2009, 149-154.*

(Continued)

*Primary Examiner* — Mark Kopec
*Assistant Examiner* — Haidung Nguyen
(74) *Attorney, Agent, or Firm* — McDermott Will & Emery LLP (57) ABSTRACT

Multicomponent nanoparticles materials and apparatuses and processes therefor are disclosed. In one aspect of the disclosure, separate particles generated from solution or suspension or by flame synthesis or flame spray pyrolysis, and the resultant particles are mixed in chamber prior to collection or deposition. In another aspect of the disclosure, nanoparticles are synthesized in stagnation or Bunsen flames and allowed to deposit by thermophoresis on a moving substrate. These techniques are scalable allowing mass production of multicomponent nanoparticles materials and films. The foregoing techniques can be used to prepare composites and component devices comprising one or more lithium based particles intimately mixed with carbon particles.

12 Claims, 9 Drawing Sheets

U.S. PATENT DOCUMENTS

| | | | |
|---|---|---|---|
| 7,226,966 | B2 | 6/2007 | Kambe et al. |
| 7,250,232 | B2 | 7/2007 | Boysen et al. |
| 7,255,962 | B2 | 8/2007 | Chisholm et al. |
| 7,276,218 | B2 | 10/2007 | Barker et al. |
| 7,285,260 | B2 | 10/2007 | Armand et al. |
| 7,416,803 | B2 | 8/2008 | Haile et al. |
| 7,601,318 | B2 | 10/2009 | Armand et al. |
| 2006/0148959 | A1 | 7/2006 | Isayev et al. |
| 2007/0169812 | A1 | 7/2007 | Robinson et al. |
| 2007/0169813 | A1 | 7/2007 | Robinson et al. |
| 2007/0298303 | A1 | 12/2007 | Boysen et al. |
| 2008/0268246 | A1 | 10/2008 | Stark et al. |

FOREIGN PATENT DOCUMENTS

| | | |
|---|---|---|
| EP | 0 997 543 A1 | 5/2000 |
| FR | 2 895 572 A1 | 6/2007 |
| KR | 10-2007-0076686 A | 7/2007 |
| WO | WO 01/16021 A | 3/2001 |
| WO | WO 2006/101986 A | 9/2006 |

OTHER PUBLICATIONS

Haile, et al., Solid acid proton conductors: from laboratory curiosities to fuel cell electrolytes, Faraday Discussions, 2007, 134, 17-39.

Itoh, et al. Direct preparation of nanoagglomerated indium tin oxide nanoparticles using various spray pyrolysis methods, J. Mater. Res. (Apr. 2004) vol. 19, No. 4, pp. 1077-1086.

Jugovic, et al., A Review of recent developments in the synthesis procedures of lithium iron phosphate powders, Journal of Power Sources (2009) 190, pp. 538-544.

Konarova et al., Preparation of carbon coated LiFePO4 by a combination of spray pyrolsis with planetary ball-milling folliowed by heat treatment and their electrochemical properties, Journal of Power Sources (2009) 191, pp. 111-116.

Llobet, et al., Screen-printed nanoparticle tin oxide films for high-yeild sensor Microsystems, Sensors and Actuators B 96 (2003) 94-104, Elsevier Science B.V.

Sastry et al., Formation of Patterned, Hetercolloidal Nanoparticle Thin Films, Langmuir 2000, 16, pp. 3553-3556.

Tolmachoff et al., "Flame synthesis of nanophase TiO2 crystalline films", 5th US Combustion meeting, Mar. 25-28, 2007, paper No. H15, pp. 1-9.

TSI—Model 3076 Constant Output Atomizer—Operation and Service Manual, Copyright © 2008 by TSI Incorporated.

Vargas, Aggregation and composition of effects on absorption and scattering properties of dye-sensitized anatase $TIO_2$ particle clusters, Journal of Quantitative Spectroscopy & Radiative Transfer (2008) 109, pp. 1693-1704.

Zhu, et al., Growth of high-density Si nanoparticles on $Si_3N_4$ and $SiO_2$ thin films by hot-wire chemical vapor deposition, Journal of Applied Physics, Oct. 15, 2002, vol. 92, No. 8, pp. 4695-4698.

Gao et al., Preparation and characterization of nano-particle LiFePO4 and LiFePO4/C by spray-drying and post-annealing method, Electrochimica Acta (2007) 53, pp. 1939-1944.

Yu et al., Preparation and characterization of mesoporous LiFePO4/C microsphere by spray drying assisted template method, Journal of Power Sources (2009) 189, pp. 794-797.

Higuch et al., Synthesis of LiFePO4 cathode material by microwave processing, Journal of Power Sources (2003) 119-121, pp. 258-261.

J. Naser et al., "Laser-Induced Synthesis of $Al_2O_3$/CU-Nanoparticle Mixtures," NanoStructured Materials, vol. 12, pp. 451-454, 1999.

Invitation to Pay Additional Fees and, where Applicable, Protest Fee issued in International Application No. PCT/US2009/067166 dated May 12, 2010.

Ju et al., "LiFePO4/C cathode powders prepared by spray pyrolysis from the colloidal spray solution containing nano-sized carbon black", Materials Chemistry and Physics (2008) 107:328-333.

Konstantinov et al., "New approach for synthesis of carbon-mixed LiFePO4 cathode materials", Electrochimica Acta (2004) 50:421-426.

Konstantinov et al., "Preparation of LiFePO4/C composite powders by ultrasonic spray pyrolysis followed by heat treatment and their electrochemical properties", Materials research Bulletin (2008) 43:3305-317.

Liu et al., "Nanoporous spherical LiFePO4 for high performance cathodes", Energy Environ. Sci. (2011) 4:885-888.

Yang et al. "LiFePO4/carbon cathode materials prepared by ultrasonic spray pyrolysis", J. Power Sources (2006) 159:307-311.

Notification of Transmittal of the International Search Report and then Written Opinion of the International Searching Authority issued in International Application No. PCT/US2009/067166 dated Aug. 24, 2010.

* cited by examiner

Fig. 3 Schematic illustration of a multicomponent nanoparticle film generator.

Fig. 4  Schematic of another multicomponent nanoparticle film generator.

200 MICRONS

FIG. 5A

10 MICRONS

MULTICOMPONENT NANOPARTICLE MATERIALS AND PROCESS AND APPARATUS THEREFOR

CROSS-REFERENCE TO RELATED APPLICATION

This application claims priority to provisional application U.S. Ser. No. 61/193,582, filed on Dec. 8, 2008, which is incorporated by reference herein in its entirety.

TECHNICAL FIELD

The present disclosure relates to multicomponent nanoparticle materials and films and processes for forming the same.

BACKGROUND

Particle compositions have varied uses and are ubiquitous in applications that exploit surface chemistry and physics. As the mean particle size of the composition is reduced, the surface area increases with the square of the particle size. This results in a corresponding increase in surface functionalities, e.g., reaction rate, due to the increase in available surface area. Examples of systems that rely on high surface area for optimal performance include catalytic converters, dye sensitized solar cells, batteries, and fuel cells. Some of these applications use nanoparticle films that consist of more than one type of nanoparticle. In such a system, various particles perform different functions.

In certain types of fuel cells, for example, the simultaneous transport of protons and electrons requires some components of the film to serve as electron conductors, and others to serve as proton conductors (Haile, Chisoholm, Sasaki, Boysen, and Uda, "Solid acid proton conductors: from laboratory curiosities to fuel cell electrolytes", Faraday Discussions 134: 17-39, 2006). In another example, a film of at least two different sizes of titania nanoparticles may be used to optimize the performance of a dye sensitized solar cell (Vargas, "Aggregation and composition effects on absorption and scattering properties of dye sensitized anatase $TiO_2$ particle clusters", Journal of Quantitative Spectroscopy & Radiative Transfer 109: 1693-1704, 2008). In such a system, the larger particles can scatter more of the incident light for more efficient collection by the smaller particles, which dominate the surface area and thus photon-induced electron excitations.

A number of methods for depositing a particle film are known where the particles are of the same composition. Tolmachoff et al. (Tolmachoff, Garcia, Phares, Campbell, and Wang, "Flame synthesis of nanophase $TiO_2$ crystalline films", Proceedings of the $5^{th}$ U.S. Combustion Meeting, Paper #H15, 2007) discloses a method for making thin films of titania particles by repeatedly passing a substrate over a stagnation flame. Other methods of making single component nanoparticle films include screen-printing or squeegeeing a nanoparticle paste (Llobet et al., "Screen-printed nanoparticle tin oxide films for high-yield sensor microsystems", Sensors & Actuators B 96: 94-104, 2003), printing a micro- or nano-particle ink (US patent applications 20070169812 and 20070169813), chemical vapor deposition (Zhu et al., "Growth of high-density Si nanoparticles on $Si_3N_4$ and $SiO_2$ thin films by hot-wire chemical vapor deposition", Journal of Applied Physics 92: 4695-4698, 2002), or spray pyrolysis (Itoh, Abdullah, and Okuyama, "Direct preparation of nonagglomerated indium tin oxide nanoparticles using various spray pyrolysis methods, Journal of Materials Research 19: 1077-1086, 2004). These references, however, do not appear to disclose methods of forming a film or materials containing a mixture of compositionally and/or functionally distinct nanoparticles.

Although compositionally and/or functionally distinct particles may be mixed in pastes or inks, the particles tend to agglomerate in suspension due to the high particle concentrations required for printing and strong inter-particle forces. Even if a surfactant were used, agglomeration would continue after deposition as any surfactant would be lost during the drying and/or sintering process. This in turn limits the individual grain size of a component in a multicomponent film to the micron scale, which is acceptable for forming films of particles that are not compositionally different. Examples of methods that produce films made from a single composition particle are disclosed in patent applications 20070169812 and 20070169813, in which an ink is formed from an organic solvent and microflakes or nanoflakes produced by milling a solid having a predetermined mixture of elements.

Patterned nanoparticle films can be made in colloidal solutions using self-assembly techniques (see, for example, Sastry, Gole, and Sainkar, "Formation of patterned, heterocolloidal nanoparticle thin films", Langmuir 16: 3553-3556, 2000). Here, the driving force is the electrostatic interactions between like or unlike particles and molecules. Although multiple particle types may be mixed, these techniques are generally very slow and are thus not suitable for continuous or large-scale fabrication of nanoparticle films.

Accordingly, a need exists for multicomponent materials, such as composites composed of distinct nanoparticles, and processes for their manufacture. There is also a need for such materials and processes to feasibly mass produce certain types of fuel cells, solar cells, batteries and other devices that can utilize multicomponent nanoparticle materials and films.

SUMMARY OF THE DISCLOSURE

Advantages of the present disclosure are multicomponent materials, processes and apparatuses for their manufacture.

These and other advantages are satisfied, at least in part, by a composite, material or film comprising a mixture of a plurality of first particles and a plurality of second particles wherein the plurality of first particles and the plurality of second particles have an average size of less than about 500 nm, e.g. less than about 200 nm. Advantageously, the plurality of first particles are compositionally distinct from the plurality of second particles.

Embodiments of the disclosure include a plurality of first particles intimately and randomly mixed with a plurality of second particles and wherein the plurality of first particles are composed of one or more components selected from the group consisting of organic compounds, inorganic compounds, metals, electrocatalysts, metal oxides, lithium active compounds, metal hydrides, metal amines, solid acids, and salts thereof and wherein the plurality of second particles are compositionally distinct or have a significantly different average size than the plurality of first particles. The composite, material or film can also comprise a plurality of third, fourth, fifth, etc particles. Other embodiments of the present disclosure include a composite comprising one or more lithium active compound particles, such as lithium-mixed metal oxides and phosphates, $LiNiO_2$, $LiCoO_2$, $LiMn_2O_4$, $LiCoMnO_4$, $LiZnSb$, $LiFePO_4$, and $Li_2FePO_4F$ particles, with carbon particles, wherein the lithium active compound particles have an average size of less than 100 nm and are intimately and randomly mixed with the plurality of carbon particles having an average size of less than 50 nm.

Other aspects of the present disclosure include processes of forming a well-mixed multicomponent material and film. The processes comprise forming a first aerosol; forming a second aerosol; and combining the first aerosol and second aerosol into a two-component aerosol to form a composite material or film comprised of a plurality of first particles from the first aerosol and a plurality of second particles from the second aerosol on a substrate. Advantageously the processes include forming the plurality of first particles and the plurality of second particles with an average size of less than about 500 nm. The plurality of first particles can be compositionally distinct from the plurality of second particles, or the plurality of first particles can have an average size that is distinct from the average size of the plurality of second particles. Alternatively, the plurality of first particles can be compositionally distinct from the plurality of second particles and can have an average size that is distinct from the average size of the plurality of second particles. The aerosolized components can be individually formed by spraying or atomizing a solution or suspension, or by flame synthesis or spray pyrolysis.

Other aspects of the present disclosure are apparatuses for providing multicomponent materials and films by forming and combining distinct aerosols. For example, an apparatus can comprise a plurality of aerosol forming burners and/or atomizers that are in fluid communication with a chamber for receiving and mixing a plurality of distinct aerosols. Embodiments include an apparatus comprising a first burner or atomizer for forming a first aerosol; a second burner or atomizer forming a second aerosol; a chamber in fluid communication with the first and second burner or atomizer for receiving and mixing the first and second aerosols; and an exit port connected to the chamber for allowing the aerosols to escape the chamber, wherein the first burner or atomizer is capable of either: (a) forming an aerosol that is compositionally distinct from the aerosol formed from the second burner or atomizer or (b) forming an aerosol that has an average size that is distinct from the aerosol formed from the second burner or atomizer.

Additional advantages of the present invention will become readily apparent to those skilled in this art from the following detailed description, wherein only the preferred embodiments of the invention are shown and described, simply by way of illustration of the best mode contemplated of carrying out the invention. As will be realized, the invention is capable of other and different embodiments, and its several details are capable of modifications in various respects, all without departing from the invention. Accordingly, the drawings and description are to be regarded as illustrative in nature, and not as restrictive.

BRIEF DESCRIPTION OF DRAWINGS

Reference is made to the attached drawings, wherein elements having the same reference numeral designations represent similar elements throughout and wherein.

FIGS. 5A and 5B are electron micrograph images of a mixed nanoparticle film including titania and carbon particles on a glass substrate where the titania particles have an average size of about 15 nm and the carbon particles have an average size of about 50 nm.

FIG. 6 is a schematic illustration of another apparatus for generating multicomponent nanoparticle films, which includes a rotating substrate over multiple particle forming burners.

FIG. 7 is a graph showing the size distribution of an aerosol mixture containing about 10 nm carbon particles formed from a premixed ethylene flame and about 50 nm cesium dihydrogen phosphate particles formed by solution atomization as determined by nano-SMPS analyzer (model 3936N25, available from TSI, Inc.).

FIG. 8 is a schematic illustration of another apparatus for generating multicomponent nanoparticle materials and films.

FIG. 9 is a top view illustrating a slot burner and atomizer of a particle forming apparatus.

DETAILED DESCRIPTION OF THE DISCLOSURE

The present disclosure is directed to materials, including materials in the form of films, comprising a mixture of at least two sets of particles, e.g. a plurality of first particles and a plurality of second particles. The designation of first and second is solely for ease of reference and does not limit the nature of the particles. Such multicomponent particle materials or films can include additional particles combined with the plurality of first and second particles, e.g. a plurality of third, fourth, fifth, etc. particles can be combined with the plurality of first and second particles.

In one aspect of the disclosure, the plurality of first particles and the plurality of second particles have an average size at the nanometer length scale. For purposes of the present disclosure, particles that have an average size at the nanometer length scale are particles having an average size of less than about 500 nm. Such particles are also called nanoparticles herein. Preferably, the plurality of first and second particles have an average size of less than about 500 nm, e.g. less than about 200, 100, 80, 60, 40, 20, 10 nm and sizes there between. The average size of the particles can be determined by any conventional means as, for example, by a particle sizer such as a scanning mobility particle sizer available from TSI, Inc. or equivalent instrument. If such instruments are not practical or available, other conventional means for determining average size of the particles can be used such as by estimating a diameter for many particles in a material from an electron micrograph image or equivalent image and taking an average of the estimated diameters.

Advantageously, the materials of the present disclosure can comprise a mixture of compositionally different particles at the nanometer length scale, i.e., a composite of compositionally distinct nanoparticles. Compositionally distinct particles are those that have compositions that vary by elemental composition and/or ratio of elements beyond the normal variation expected for a given composition. Compositionally distinct particles can serve different functions in the same material. In one embodiment of the present disclosure, the material or film comprises a mixture of a plurality of first particles and a plurality of second particles wherein the plurality of first particles and the plurality of second particles have an average diameter of less than about 500 nm, e.g., less than about 200 nm, and wherein the plurality of first particles are compositionally distinct from the plurality of second particles.

The materials and processes for the preparation of such materials are believed advantageous compared to methods that involve mechanical mixing (such as ball milling a mixture) which usually produces grain sizes that are on the micrometer scale. For example, it is believed that by milling a powder mixture consisting of nanometer-sized particles would result in a mixed powder that would still only have a grain size of roughly 1 micrometer due to the tenacious van der Waals and electrostatic interactions between nano- and micro-sized grains. Thus, even though the individual particle sizes could be on the order of nanometers in diameter, the resulting mixture would feature single component agglomerates on the order of micrometers in size. This precludes the possibility of achieving random, dispersed or ordered patterns of nano-sized grains in the mixture.

An advantage of the present disclosure is materials and films comprising random and/or dispersed, compositionally distinct nano-sized particles. In one aspect of the present disclosure, the material or film includes a plurality of first particles that are intimately and randomly mixed with a plurality of second particles that are compositionally distinct from the first particles.

The multicomponent particle materials can be made from a number of starting particles. These include particles that can be formed in flames (such as carbon and metal oxides) or spray pyrolysis (such as metal oxides), as well as particles that can be formed from atomization and drying of a solution or suspension (such as cesium dihydrogen phosphate in water and platinum nanoparticles in ethanol). The compositions of the particles are limited to those which can be formed by an aerosol. As used herein, an aerosol means a dispersion of solid and/or liquid particles suspended in a gas. Aerosols can be formed from a medium composed of a solid either dissolved or suspended in a solvent or liquid that is sufficiently volatile to allow formation of particles in a flame or atomizer. Aerosols can also be formed by combustion of a hydrocarbon to produce solid carbon particles suspended in a gas such as the formation of carbon particles with a Bunsen burner.

Solvent or liquid mediums that can be used with atomizers include, for example, one or more of water, alcohols and lower alcohols, e.g., a $C_{1-12}$ alcohol, such as methanol, ethanol, propanol, isopropanol, butanol, furfuryl alcohol; polyhydridic alcohols, such as ethylene glycol, butanediols, propanediols; ethers, such as linear or branched lower ethers, dimethyl ether, ethyl ether, methyl ethyl ether, tetrahydrofuran; ketones and linear or branched lower ketones, such as acetone, methyl ethyl ketone; organic acids, such as formic acid, acetic acid, butyric acid, benzoic acid; esters, such as formats, acetates, propionates; hydrocarbons, such as linear or branched alkanes, such as butanes, pentanes, hexanes, heptanes, octanes, linear or branched alkenes, aromatic solvents or liquids; chlorinated solvents or liquids; etc. In an embodiment of the present disclosure, the solvent or suspending liquid is an aqueous medium having one or more acids, e.g. HCl, or bases, e.g., ammonia, to adjust the pH of the medium and can also include one or more surfactants and/or buffers.

The plurality of first, second, third, etc. particles can be composed of one or more components selected from the group consisting of organic compounds such as carbon, carbon nanotubes, and fullerenes; metals such as aluminum, platinum, silver, gold, palladium, tin, titanium, indium, and zinc; metal oxides, such as alumina, tin oxides, titania, zinc oxides, indium oxides, and zirconium oxide; semiconductors and oxides and nitrides thereof such as silicon, gallium, cadmium, terrarium, silicon oxides, and silicon nitride; metal hydrides; metal amines; solid acids such as $CsH_2PO_4$, $CsHSO_4$, $Cs_2(HSO_4)(H_2PO_4)$, $(NH_4)_3H(SO_4)_2$, $CaNaHSiO_4$, etc.; inorganic components, such as indium-tin-oxides, aluminum-doped zinc oxide, indium molybdenum oxide, antimony-tin-oxides, zinc doped with various other elements such as F, In, Ga, B, Si, Ge, Ti, Zr, Hf, Sc, Y, and salts of the forgoing, lithium active compounds useful for batteries, such as lithium-mixed metal oxides and phosphates, $LiNiO_2$, $LiCoO_2$, $LiMn_2O_4$, $LiCoMnO_4$, LiZnSb, $LiFePO_4$, and $Li_2FePO_4F$, etc.

The second set of particles can be composed of the one or more of the foregoing components but are either compositionally distinct or have an average size that is significantly different from the first plurality of particles. Preferably, the first and second plurality of particles have an average size that is less than about 500 nm and are intimately and randomly dispersed throughout the multicomponent material.

The multicomponent materials can be used in a solid acid fuel cell, in which the anode includes a porous well-mixed nanoparticle film comprised of solid acid particles, e.g., $CsH_2PO_4$, $CsHSO_4$, $Cs_2(HSO_4)(H_2PO_4)$, $(NH_4)_3H(SO_4)_2$, $CaNaHSiO_4$, electron-conducting particles and electro catalyst particles.

In an embodiment of the disclosure, a multicomponent particle film includes a plurality of solid acid particles, a plurality of conducting particles, e.g., carbon, and a plurality of electrocatalyst particles, e.g., Pt, Ru, Rh, Pd, Cu, Ni, Ag, Au, Sn, etc. Such films can be used as proton conducting membranes for fuel cells as disclosed in, for example, U.S. Pat. Nos. 6,468,684; 7,250,232 and 7,255,962. As noted in these patents, many solid acids can be used for such films including compounds of the general form: $M_aH_b(XO_t)_c$ or $M_aH_b(XO_t)_c.nH_2O$, where M is one or more of $Li^+$, $Be^+$, $Na^+$, $Mg^+$, $K^+$, $Ca^+$, $Rb^+$, $Sr^+$, $Cs^+$, $Ba^+$, $Tl^+$ and $NH_4^+$ or $Cu^+$; X is one or more of Si, P, S, As, Se, Te, Cr and Mn; and a, b, c, n and t are rational numbers and/or non-zero integers.

In optimizing a proton conducting membrane, transport of ions and gases through the film should be considered and the porosity and the microstructure of the film adjusted accordingly. For example, it is believed that optimizing a proton conducting membrane would include a membrane structure having high porosity and low tortuosity. It is believed such a structure can be made by including gas diffusion channels embedded in the membrane by initially depositing fractal-like carbon agglomerates to retain micro-sized open spaces in the membrane followed by forming a multicomponent nanoparticle film in and among the carbon composed of a mixture of solid acid particles, carbon particles and electrocatalytic particles.

Multicomponent materials can also be used in batteries, such as lithium or lithium-ion batteries in which the cathode comprises lithium active compounds, such as lithium-mixed metal oxides and phosphates, $LiNiO_2$, $LiCoO_2$, $LiMn_2O_4$, $LiCoMnO_4$, LiZnSb, $LiFePO_4$, $Li_2FePO_4F$, etc. particles, together with carbon particles. In an embodiment of the present disclosure, a multicomponent nanoparticle composite comprises a plurality of lithium active compound particles, e.g. lithium iron phosphate particles, and a plurality of carbon particles. Advantageously, the lithium active compound and carbon particles are intimately and randomly dispersed throughout the composite. In an aspect of the present disclosure, the lithium active compound particles, e.g. lithium iron phosphate particles, have an average size that is less than about 200 nm, e.g., less than about 100, 50, 20 nm and sizes there between, and the carbon particles have an average size that is less than about 200 nm, e.g., less than about 100, 50, 20, 10 nm and sizes there between.

Lithium ion batteries are increasingly being made using lithium iron phosphate ($LiFePO_4$) as a cathode material. A primary advantage of lithium iron phosphate is that it is safer than other commonly used materials (such as lithium cobaltate or lithium vanadate) because of a minimized risk of runaway heating and explosion. Upon discharge of the battery, the iron (II) is oxidized to iron (III), the resulting free electron exits the battery through the load and returns to the anode, while the Li+ ion is transmitted to the anode through an electrolyte. Since the rate of discharge depends on the area of contact between the electrolyte and the lithium iron phosphate surface, high performance batteries require small grain sizes of lithium iron phosphate. An issue with lithium iron phosphate, however, is that it exhibits poor electrical conductivity, making it difficult for the free electron to exit the cathode, and thus limiting the discharge rate of the battery.

One way to overcome this deficiency is to intimately mix carbon particles with the lithium iron phosphate grains in order to enhance the electrical conductivity of the cathode. It is preferable that the mixing length scale of the mixture be on the same scale as the grain size so that electrons from each lithium iron phosphate grain may be efficiently extracted and transmitted out of the cathode. In an embodiment of the present disclosure, a multicomponent nanoparticle composite comprises lithium iron phosphate particles and carbon particles which are intimately and randomly dispersed throughout the composite, wherein the lithium iron phosphate particles have an average size that is less than about 200 nm, e.g., less than about 100, 50, 20 nm and sizes there between and carbon particles have an average size that is less than about 200 nm, e.g., less than about 100, 50, 20, 10 nm and sizes there between. Additionally, the lithium iron phosphate particles can be doped to enhance their performance such as by doping with one or more metals including, for example, magnesium, aluminum, titanium, zirconium, niobium, and tungsten.

In an aspect of the present disclosure, multicomponent materials can be formed by combining a plurality of distinct aerosolized components in the gas phase and collecting the mixture, such as by an electrostatic precipitator, or depositing the mixture on to a substrate as a film or powder. The aerosolized components can be individually formed by spraying or atomizing a solution or suspension, or by flame synthesis or spray pyrolysis.

In an embodiment of the present disclosure, a well-mixed, multicomponent nanoparticle material can be prepared by forming a first aerosol; forming a second aerosol; and combining the first aerosol and second aerosol to form a material comprised of a plurality of first particles from the first aerosol and a plurality of second particles from the second aerosol. The processes of the present disclosure are not limited to forming materials with compositionally distinct particles but in certain embodiments the processes of the present disclosure can also form particles having distinct averages sizes. Hence, the plurality of first particles can either: (a) be compositionally distinct from the plurality of second particles and/or (b) have an average size that is distinct from the average size of the plurality of second particles. In an embodiment of the present disclosure, the plurality of first particles: (a) are compositionally distinct from the plurality of second particles and (b) have substantially the same average size as the plurality of second particles. In another embodiment of the present disclosure, the plurality of first particles: (a) have substantially the same composition as the plurality of second particles and (b) have an average size that is significantly different than the average size of the plurality of second particles, e.g., wherein the plurality of second particles have an average size that is no more than about two to fifty times of the average size of the plurality of first particles, e.g., 2, 5, 10 or 50 times the average size of the plurality of first particles. In another embodiment of the present disclosure, the plurality of first particles: (a) are compositionally distinct from the plurality of second particles and (b) have an average size that is distinct from the average size of the plurality of second particles.

The first and/or second aerosols can be formed by atomizing a solution, atomizing a particle suspension, by flame synthesis and/or flame spray pyrolysis.

As used herein atomizing and atomization refer to the conversion of a liquid medium into a spray or mist (i.e. collection of drops). Atomization can occur by passing a liquid medium through a nozzle or aperture. The terms atomizing and atomization do not mean that the spray or mist or the particles therefrom are reduced to atomic sizes. Atomization can also be described as "nebulize" or "nebulization". Atomizing a liquid medium can be achieved by use of an atomizer. Atomizers are known and are commercially available, such as from TSI, Inc. of Shoreview Minn., USA.

Given the guidance of the present disclosure, one skilled in the art can select the appropriate parameters to optimize the properties of the particles, and their dispersion in a mixed particle film.

For example, an aerosol can be formed from a solution or suspension by atomizing the liquid into small droplets and then allowing the droplets to dry into aerosol particles prior to and/or during mixing with the other aerosol particles formed in separate tubes. The atomization may be initiated by injecting the liquid into a high velocity gas jet using a syringe pump or venturi aspiration. In forming a well-mixed nanoparticle film, it is preferable to control the vapor pressure of the liquid and the number density of the droplets and resulting particles. For example, the liquid vapor pressure should be lower than its saturation vapor pressure so that the liquid does not recondense onto the particles or onto the film. This liquid vapor pressure can be kept low by limiting the injection rate of the solution or suspension into the high velocity jet. Conversely, the saturation vapor pressure can be kept high by maintaining the aerosol flow at a high temperature using a heating element such as heating tape, heating coils, and/or the heat generated from a flame. The number density of the aerosol is preferably kept low enough to minimize coagulation and agglomeration of the aerosol prior to deposition, which would increase the grain size of the particles comprising the multicomponent film. The number density can be kept low by quickly dispersing the aerosol in a clean sheath gas, or by maintaining a low liquid injection rate.

Alternatively, or in combination, an aerosol can also be formed by flame synthesis or flame spray pyrolysis with an appropriate burner. Creating nanoparticles in a flame serves the dual purpose of keeping the mixed aerosol flow hot enough to prevent condensation if an atomization methodology is also used in parallel to the flame. Flame synthesis techniques involve the establishment of a premixed or diffusion flame, and passing one or more precursor compounds in a medium, if desired, into the flame where they are separated from their medium, if any, oxidized or undergo pyrolysis. The desired products of the oxidation or pyrolysis may nucleate and grow into the particles that ultimately deposit on the film.

One example is the formation of metal oxide particles by the oxidation of organometallic compounds. Flame synthesis can also be used to form a plurality carbon particles by igniting a fuel with an oxidant. This done by adding an excess of fuel or any other hydrocarbon to the flame with respect to the stoichiometric amount given the oxygen flow rate into the flame. The excess carbon nucleates to form particles commonly visualized as soot from a candle. The fuel can contain a mixture comprising a hydrocarbon (e.g., one or more of an alkane, such as propane, butane, an alkene, such as ethylene, an alkyne, such as acetylene, etc.) and optionally an inert gas (e.g., argon). The fuel can also contain an oxidant, such as oxygen. Alternatively, the oxidant can be supplied separately to the fuel. When the fuel mixture is rich in hydrocarbon relative to oxidant, then all of the oxidant is consumed thereby leaving an oxidant deficient environment, which can be useful as a reducing environment for certain applications. Flame spray pyrolysis involves spraying solution droplets through an established flame in order to initiate droplet breakup, drying, and possibly thermal decomposition in the high-temperature environment. The resulting aerosol can then be collected such as by filtration, impaction, electrophoresis, thermophoresis or deposited as a film on a substrate that can be used in a device.

Passing the mixed aerosol through a porous substrate (having pore size of less than about 1 micron) results in a uniform well-mixed film comprised of the particles formed in each aerosol prior to mixing. For particles smaller than about 100 nm in diameter, the dominant mode of collection by the filter is believed to be diffusion, which results in a uniform deposition pattern if the aerosol mass flow through the filter is uniform. This may be contrasted with particle collection by impaction, such as by impinging an aerosol jet onto a flat substrate, which results in deposition patterns on the substrate that are sensitive to the particle size and density. This mode of collection will not result in a well-mixed film, as particles will separate based on their inertia. However particle collection by impaction can be used to form well-mixed multicomponent nanoparticle materials if the aerosol concentration is sufficiently high to enable efficient agglomeration of the mixed aerosol particles, such that large agglomerates comprising a mixture of the aerosol components are formed in the carrier gas and subsequently impacted onto a substance.

In another aspect of the present disclosure, well-mixed multicomponent nanoparticle films can be formed onto a moving substrate by multiple flames oriented towards the substrate. Each time the substrate passes over a flame, a small mass (for example, less than a monolayer) is collected on the substrate. Repeatedly passing the substrate over multiple flames, each forming different types of nanoparticles, results in a well-mixed multicomponent film. The flames may be Bunsen flames or premixed stagnation flames.

In an embodiment of the present disclosure, a multicomponent composite material can be prepared by combining an aerosol of lithium active compound particles, e.g. lithium iron phosphate particles, or precursors thereof with an aerosol of carbon particles to form the composite. An aerosol of lithium active compounds can be formed, for example, by atomizing a precursor solution of the lithium active compound which can be prepared by combining various lithium and metal compounds and salts thereof in a medium. For example a lithium iron phosphate precursor can be prepared from a number of precursors, including lithium precursors such as lithium acetate, lithium hydroxide, lithium nitrate, lithium oxalate, lithium oxide, lithium phosphate, lithium dihydrogen phosphate, lithium carbonate, iron precursors such as iron sulfate, iron acetate, iron (II) oxalate, iron (III) citrate, iron (II) chloride, phosphate precursors such as phosphoric acid, $P_2O_5$, etc.

For example, solid lithium iron phosphate may be formed in an aqueous solution by combining lithium carbonate or lithium acetate with phosphoric acid, and iron (II) chloride or iron (II) oxalate. Under neutral stoichiometric conditions, $LiFePO_4$ precipitates as a greenish solid having olivine crystal structure. However, the precipitation may be suppressed by making the solution acidic. The pH of the solution can be adjusted by adding such acids as HCl, nitric acid, sulfuric acid, acetic acid, etc. Such an acidic solution can be atomized and formed into lithium iron phosphate by atomization, spray pyrolysis, etc. In one aspect of the present disclosure, an aerosol of lithium iron phosphate is formed by atomizing an acidic solution of lithium iron phosphate precursor by ultrasonic atomization, venture atomization, etc. The aerosol can be subsequently carried to a flame produced by the combustion of a hydrocarbon (e.g., one or more of an alkane, alkene and alkyne) and oxidant (e.g., oxygen), by a carrier gas, which may be an inert gas (e.g., nitrogen, argon, etc.) or fuel.

The flame can provide heat for micro-explosion of the aerosol droplets and evaporation of the solvent to form nanoparticles of lithium iron phosphate. The flame can also be made rich with hydrocarbon fuel to form carbon nanoparticles for combining with the resulting lithium iron phosphate nanoparticles which can then be co-deposited or collected. An advantage of using a flame rich with hydrocarbon fuel is that is will maintain a reducing environment, so that the collected lithium iron phosphate does not oxidize to Fe (III), and so that any iron that has oxidized to Fe(III) in the flame can be subsequently reduced back down to Fe(II).

A straight forward way to collect the aerosol particles is to pass the flow through a carbon filter, which itself can serve as a lithium ion battery cathode. In this way, lithium active compound particles and carbon nanoparticle production, mixing, and collection onto a battery electrode is accomplished in a single process. For example, a cathode electrode can be made by depositing a composite comprising a plurality of lithium active compound particles intimately and randomly mixed with a plurality of carbon particles on to an appropriate substrate, e.g., a substrate containing carbon and/ or a fluorinated polymer such as polyvinylidene fluoride (PVDF) and metal foil. Advantageously, the plurality of lithium active compound particles and carbon particles have an average size of less than 200 nm. In an embodiment of the present disclosure, the lithium active compound particles comprise lithium iron phosphate and have an average size of less than 100 nm and the plurality of carbon particles have an average size of less than 50 nm.

In an aspect of the present disclosure, apparatuses are described that can form multicomponent materials, including materials in the form of films, comprising a mixture of at least two sets of nanoparticles. For example, apparatuses can comprise a plurality of atomizers and/or a plurality of burners for forming compositionally distinct particles and/or particles having distinct average sizes. The apparatuses of the present disclosure are not limited to forming materials with compositionally distinct particles but in certain embodiments can also form particles having distinct averages sizes.

In one embodiment of the present disclosure, an apparatus for forming multicomponent materials comprises: means for forming a first aerosol; means for forming a second aerosol; and means for combining the first aerosol and second aerosol to form a plurality of first particles from the first aerosol and a plurality of second particles from the second aerosol. The apparatus is configured so that the plurality of first particles and the plurality of second particles have an average size of less than about 500 nm, e.g., less than about 200 nm, and/or the plurality of first particles are compositionally distinct from the plurality of second particles.

An apparatus for combining distinct aerosols can include a first burner or atomizer for forming a first aerosol; a second burner or atomizer forming a second aerosol; a chamber in fluid communication with the first and second burners or atomizers for receiving and mixing the first and second aerosols; and an exit port connected to the chamber for allowing the aerosols to escape the chamber, wherein the first burner or atomizer is capable of either: (a) forming an aerosol that is compositionally distinct from the aerosol formed from the second burner or atomizer or (b) forming an aerosol that has an average size that is distinct from the aerosol formed from the second burner or atomizer. The designation of first or second is for convenience and does not limit the nature of the particles or structure of the apparatus. Advantageously, the apparatuses can include chambers and/or exit ports in the form of a slot, and/or burners and/or atomizers having nozzles or apertures in the form of a slot, i.e., an elongated aperture.

Figure 1:
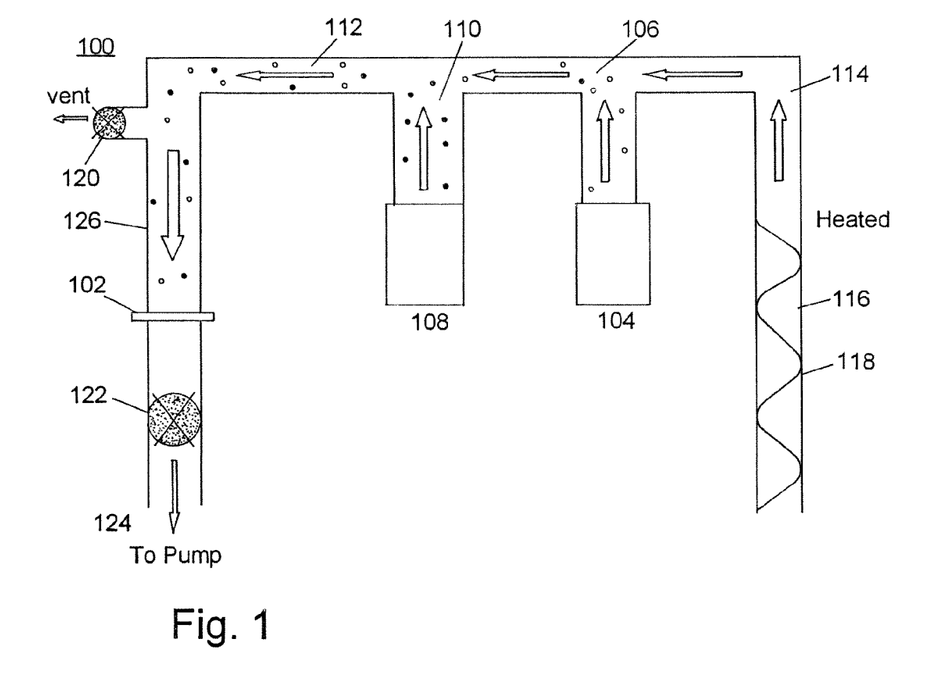
FIG. 1 is a schematic illustration of an apparatus for generating multicomponent nanoparticle films, which includes multiple atomizers.
Figure 2:
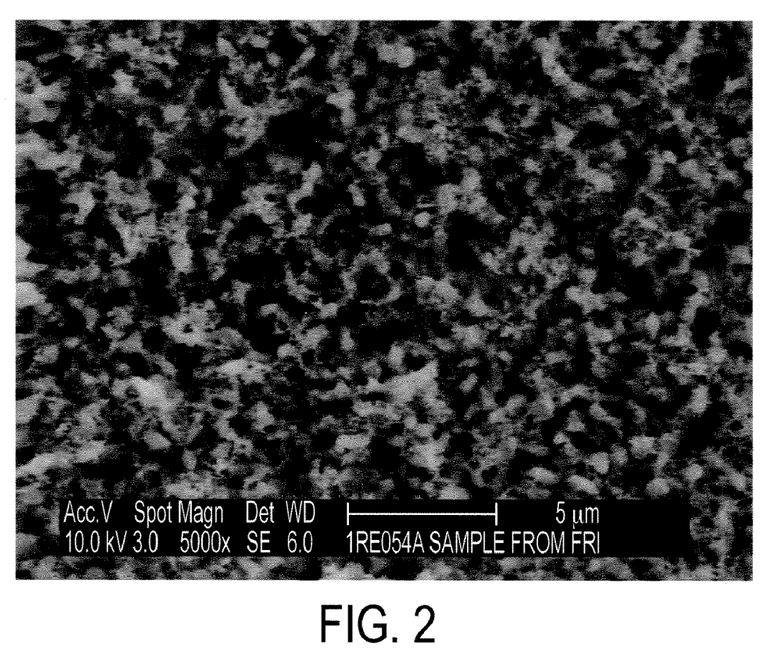
FIG. 2 is an electron micrograph image of a mixed porous nanoparticle film containing cesium dihydrogen phosphate, carbon, and platinum particles where the cesium dihydrogen phosphate particles have an average size of about 50 nm, the carbon particles have an average size of about 20 nm, and the platinum particles have an average size of about 20 nm.

FIG. 1 illustrates apparatus 100 that can be used to form multicomponent particle materials and films. The conduits and lining of apparatus 100 can be any material, such as those that do not substantially interfere with the formation of the particles including glass and stainless steel, etc. As shown in this illustration, aerosol film generator 100 can be used to form multicomponent films or powders on to a substrate 102, e.g. a carbon filter, by forming and combining several aerosolized components which exit chamber 112 through exit port 126, which can be in the form of a slot. In the present illustration, first atomizer 104 forms first aerosol 106 for forming a plurality of first particles and second atomizer 108 forms second aerosol 110 for forming a plurality of second particles. The designation of first or second is for convenience and does not limit the nature of the particles or structure of the apparatus. Atomizers 104 and 108 can be any atomizers such as commercially available atomizers or can be fabricated as a venturi atomizer that can be used to form aerosolized particles. Atomizers 104 and 108 can have nozzles in the form of a slot.

First and second atomizers (104, 108) are in fluid communication with chamber 112. In this embodiment chamber 112 is a tube connecting first atomizer 104 to second atomizer 108. However, Chamber 112 can be in the form of a slot. Chamber 112 connects the atomizers and allows mixing of the aerosols. As shown in FIG. 1, chamber 112 is in fluid connection to a heating element 114. In this embodiment, heating element 114 comprises conduit 116 in fluid communication and connected to chamber 112 which carries a gas, e.g. an inert gas such as argon or nitrogen, which is heated by passing through conduit 116 which is heated by heating tape 118 contacting the conduit. The heating element can be used to dry any atomized liquid, i.e., the first and/or second aerosols, and/or to minimize or prevent recondensation of any liquid from the first and/or second aerosol. Preferably, chamber 112 and conduit 116 are constructed of stainless steel. Vents 120 and 122 can be used to control the pressure inside chamber 112 as, for example, when the pressure drops across a porous substrate with increased loading. In this embodiment vent 122 is connected to pump 124 for further control of the pressure within chamber 112 and/or the rate at which the aerosols leave exit port 126.

Figure 3:
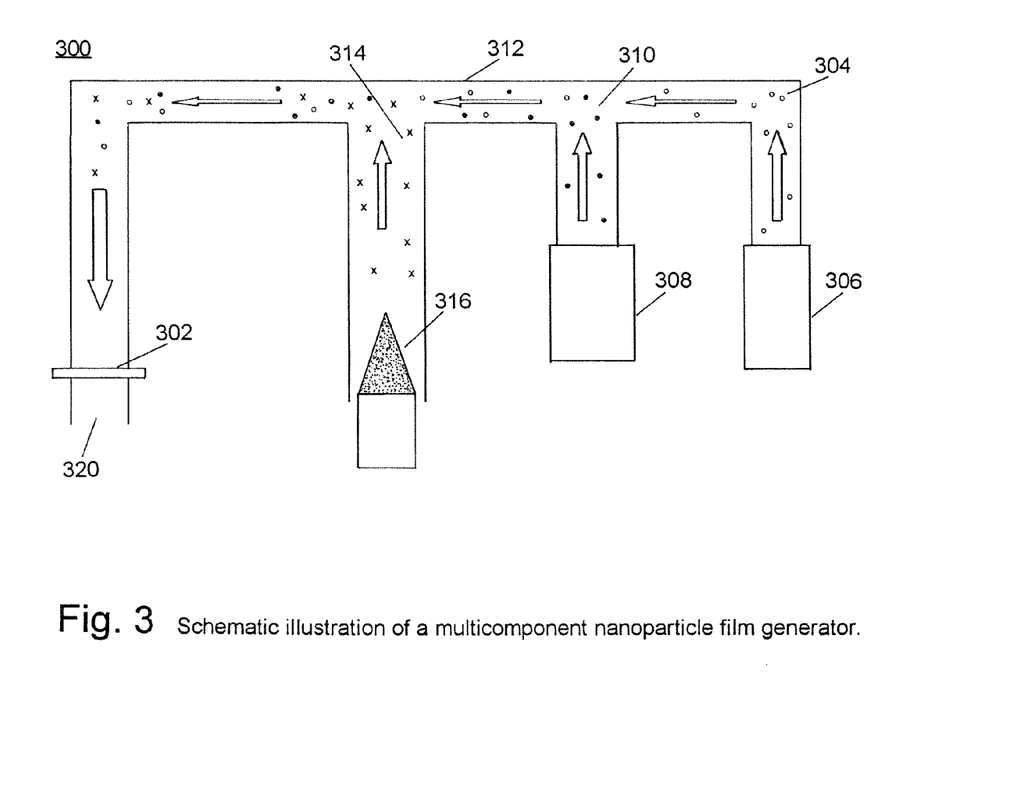
FIG. 3 is schematic illustration of another apparatus for forming multicomponent nanoparticle materials and films, which includes multiple atomizers and a particle forming burner.

FIG. 3 illustrates another apparatus that can be used in the formation of multicomponent particle materials and films. As shown in this illustration, apparatus 300 can be used to form multicomponent films on to substrate 302 by forming and combining several aerosolized components. In the present illustration, first aerosol 304 is formed from first atomizer 306. Second atomizer 308 can be used to form second aerosol 310. Atomizers 306 and 308 can be any atomizers such as commercially available atomizers. First and second aerosols (304, 310) are mixed in mixing tub 312. Mixing conduit 312 is in fluid communication with the first and second aerosol. As shown in FIG. 3, third aerosol 314 can be formed from flame nozzle 316. In this embodiment, flame nozzle 316 can form an aerosol of carbon nanoparticles by igniting a mixture comprising a hydrocarbon (e.g., one or more of an alkane, such as propane, butane, alkene, such as ethylene, alkyne, such as acetylene, etc.) with and oxidant (e.g., air, oxygen) and optionally with an inert gas (e.g., argon).

When fuel and carrier gas are rich in a hydrocarbon, the combustion products of the hydrocarbon includes carbon particles produced at flame which can intimately and randomly mix with aerosol. Further under such conditions, the mixing conduit is substantially free of oxidant because any oxidant, e.g., oxygen, is consumed during the combustion of the fuel. When an aerosol from an atomizer is introduced to the mixing conduit under such conditions and is carried by a gas substantially free of oxidants, e.g., such as by a nitrogen stream or even a hydrocarbon stream, the conduit comprises a reducing environment for the aerosol.

The heat from the combusted gases can be used to dry first and second aerosols 304, 310. Particles from aerosols 304 and 310 can then be collected through exit port 320 as well mixed nanoparticles. In this embodiment, the particles from the aerosols are collected on substrate 302.

Figure 4:
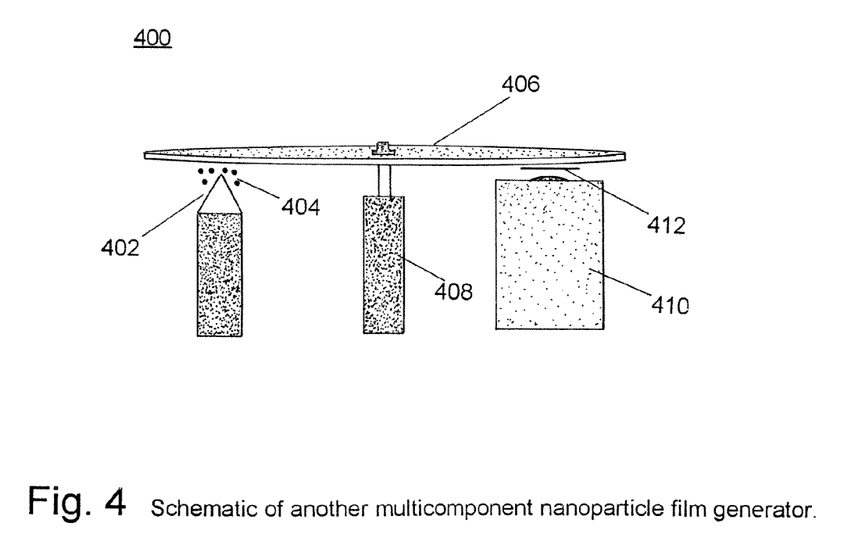
FIG. 4 is a schematic illustration of another apparatus for generating multicomponent nanoparticle films, which includes a rotating plate over multiple particle forming burners.
Figure 5A:
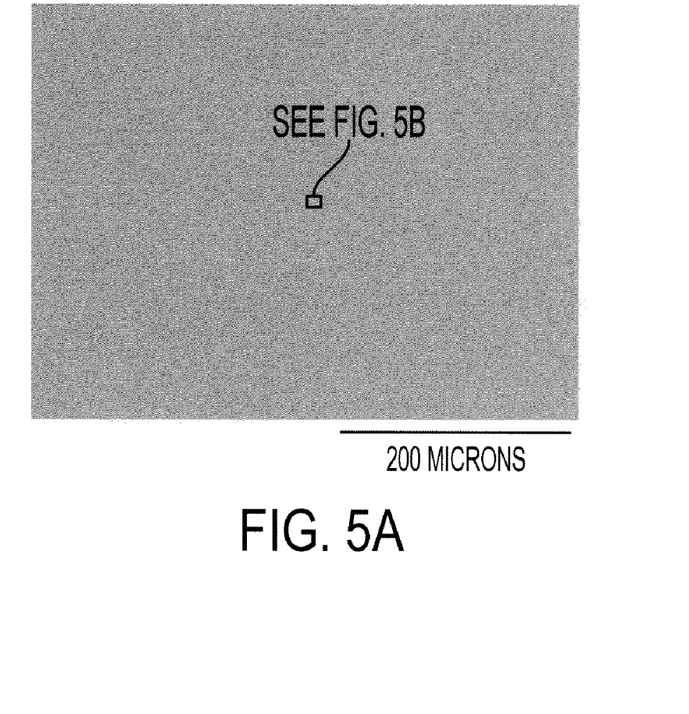
Figure 5B:
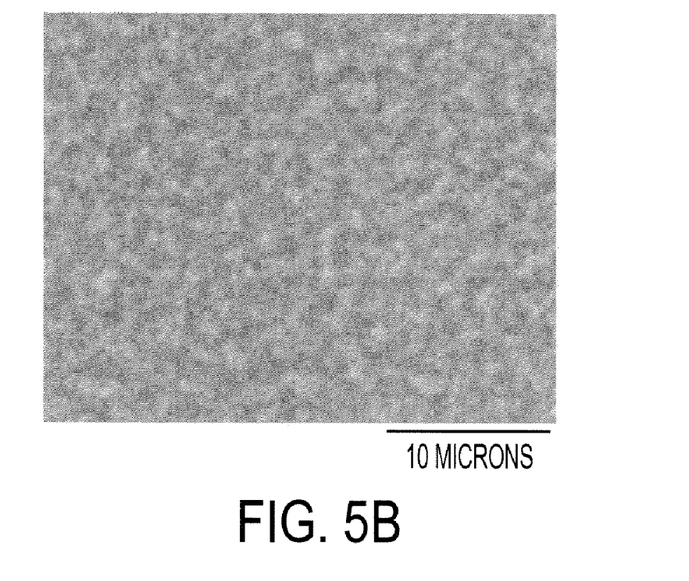

FIG. 4. Illustrates another apparatus for preparing multicomponent particle materials. Apparatus 400 includes Bunsen burner 402 for generating an aerosol of carbon nanoparticles 404 that can be formed by combusting hydrocarbons, which are collected on plate 406 rotated by spindle 408 attached to a motor (now shown for illustrative convenience) for rotating spindle 408 and plate 406. The apparatus further includes burner 410 for generating stagnation flame 412 which can produce additional nanoparticles. By this apparatus, a plurality of first particles can be generated by Bunsen burner 402 and a plurality of second particles can be generated by stagnation burner 410. These particles are collected and mixed while being deposited on plate 406 and the formed material can then be removed from the plate.

Figure 6:
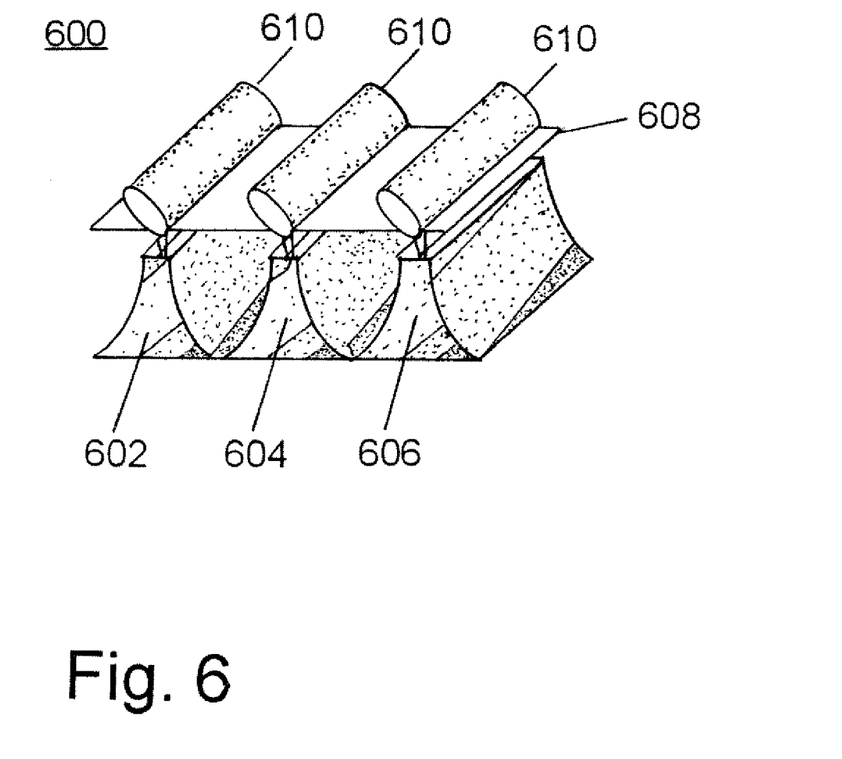
Figure 7:
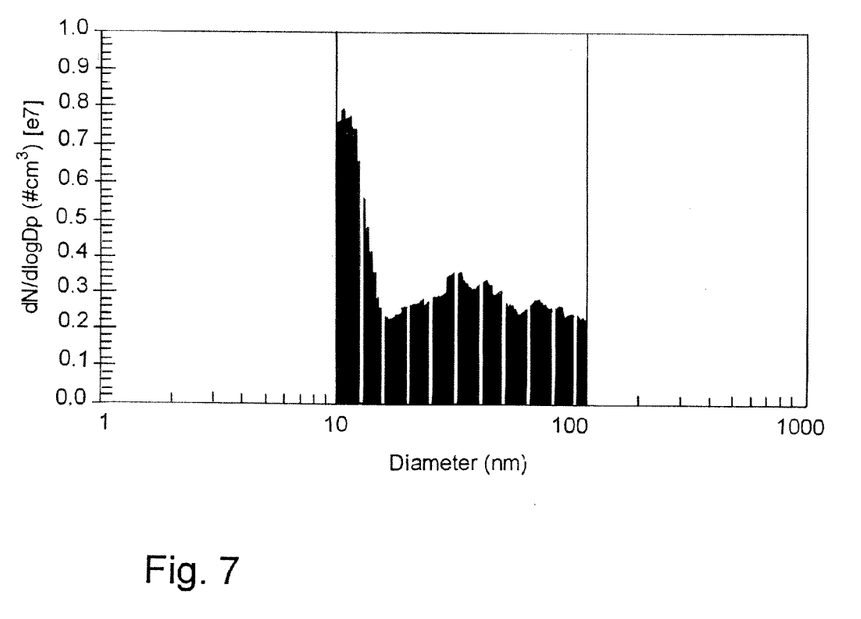

FIG. 6 is a schematic illustration of a burner set up using a plurality of burners (shown in FIG. 6 as burners 602, 604, 606) that can be used to form one or more multicomponent films on a substrate. Each burner can be configured to form more than type of aerosol against substrate 608. In this example, burner 602 is configured as an aerodynamically shaped slot but any one or multiple burner configuration can be used. For example, a stagnation flame can be formed through a suitably shaped burner, such as an aerodynamic nozzle, tubular or slot burner. Each burner is used to form a stagnation flame (not shown for illustrative convenience) which can be stabilized by substrate 608 which can be movably positioned over each burner so as to form a continuously moving substrate. In this example, substrate 608 stabilizes the plurality of stagnation flames and is in the form of a long sheet; however, other substrate forms can be used depending on the positioning of the burners, e.g., a disc can be used with multiple burners arranged in a circle. As shown in FIG. 6, substrate 608 is moved over the burners by rotating drums 610. In FIG. 6, drum 610 is directly over a burner with the substrate there between. While it may be advantageous to have the drums more or less directly over the burners, as for example, to aid in cooling the substrate, the drums need not be so positioned. Some or no drums may be over the burners.

The arrangement in FIG. 6 provides several advantages. By using a plurality of burners, the substrate temperature can be maintained at a lower temperature by moving the substrate against the multiple flames at a faster rate that it would need to pass against a single burner to maintain the same rate of deposition of material on the substrate. Use of multiple burners also permits faster deposition of materials on the substrate. Moreover, by using a plurality of burners, each burner and stagnation flame can be individually configured to deposit compositionally distinct particles and/or particles having distinct average sizes on to the moving substrate. Each burner can be individually configured to produce any stagnation flame and to produce either the same or different particles on the moving substrate. The formed particles can then be removed from the substrate and used as a multicomponent particle material or film.

Figure 8:
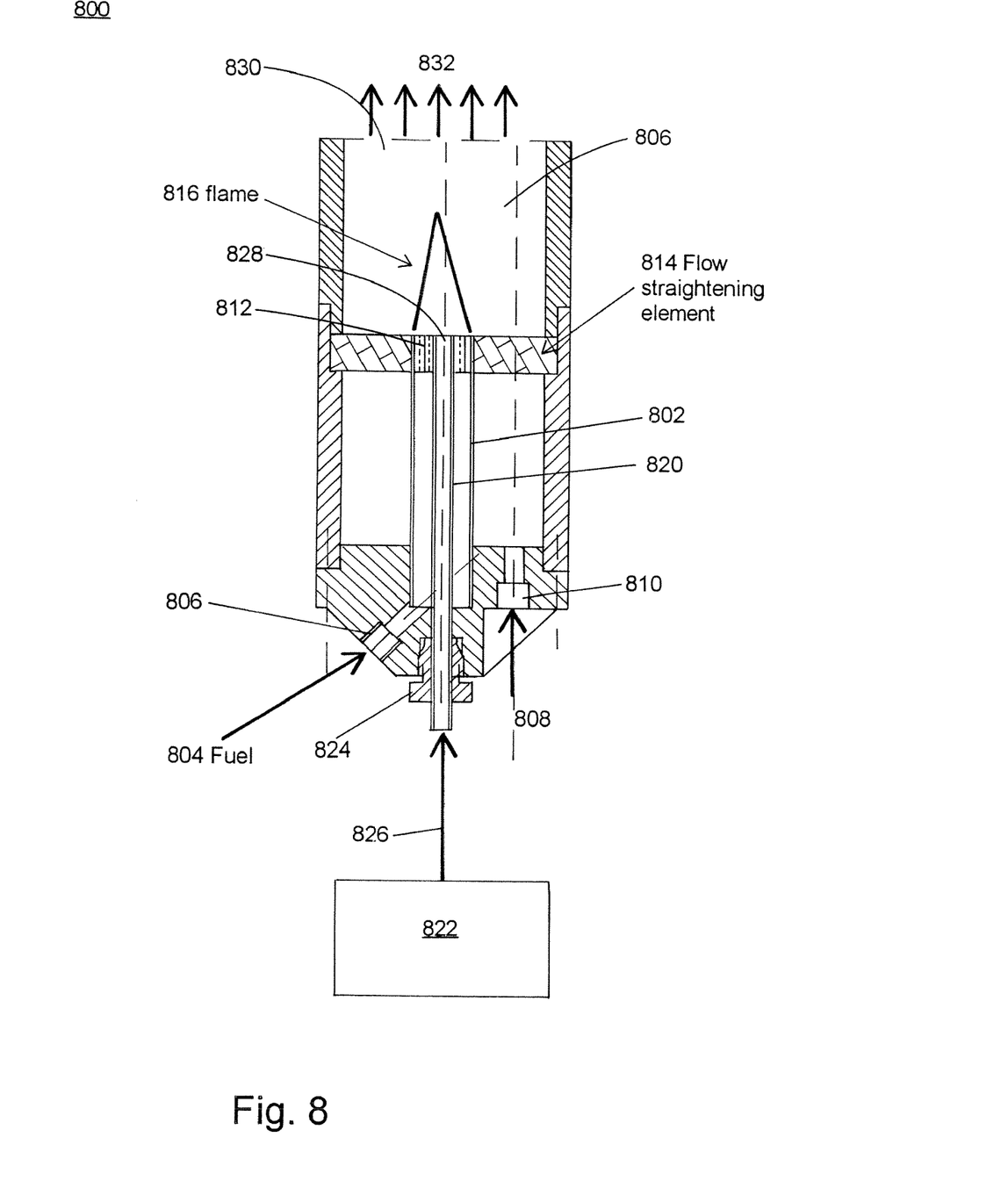
Figure 9:
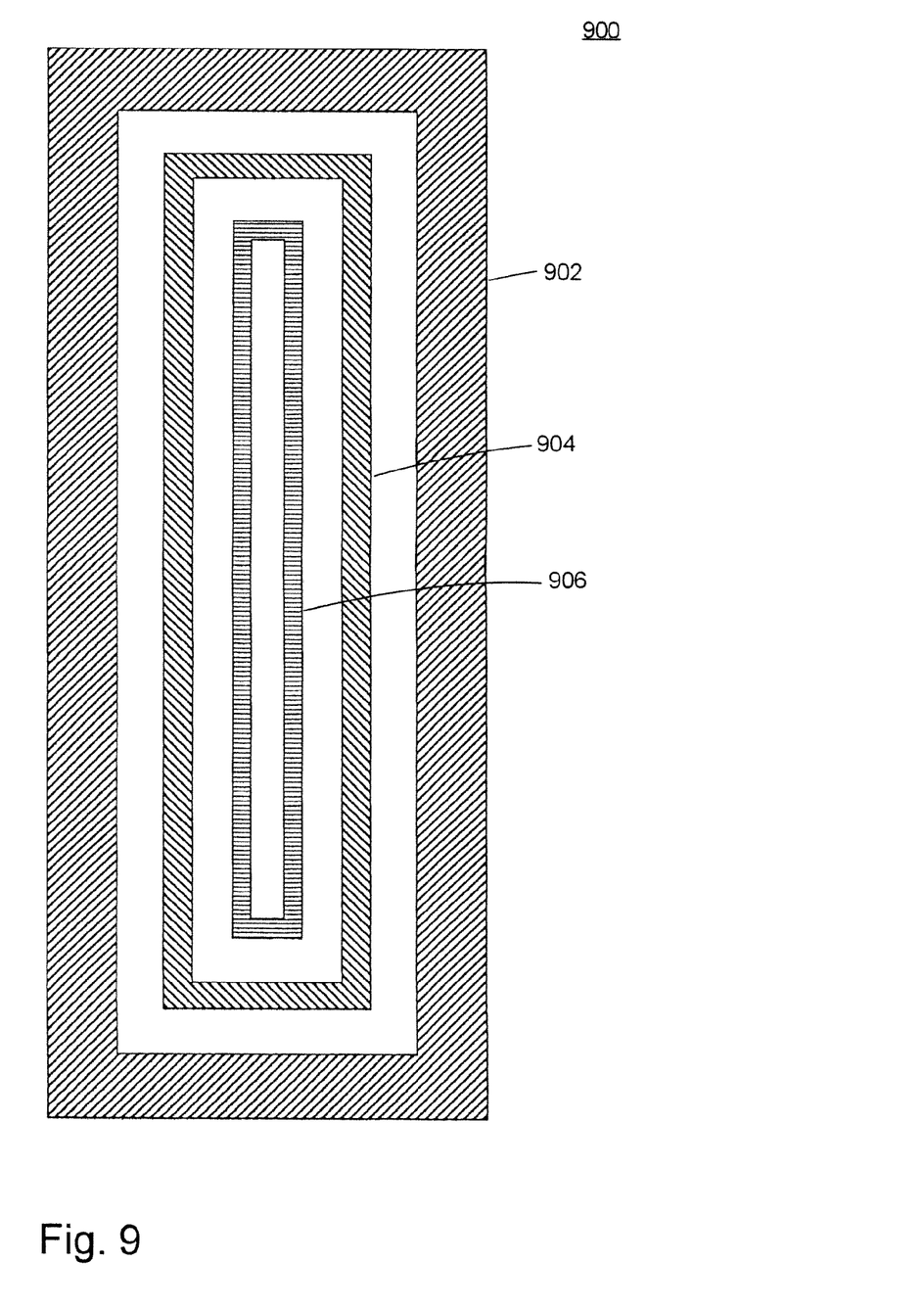

FIG. 8 is a schematic illustration of another apparatus for forming multicomponent materials. As shown in this illustration, apparatus 800 includes conduit 802 for carrying fuel 804, e.g., a hydrocarbon and/or a hydrocarbon with an oxidant and/or with a carrier gas, through port 806 which is in fluid communication with conduit 802. Fuel 804 is carried along conduit 802 to aperture 812 which contains a porous plug (which could alternatively be a screen mesh and to chamber 806 where it is mixed with carrier gas 808 which is introduced to chamber 806 through port 810. In this embodiment, conduit 802 and aperture 812 are included within chamber 806 and chamber 806 also contains flow straightening element 814, which can be made of a porous material such as compressed brass. Flow straightening element 814 is used to distribute the flow of carrier gas 808 to chamber 806. Flow straightening element 814 can be flush with the top of conduit 802 or can be some distance below the top of conduit 802.

An ignition source (not shown for illustrative convenience) is used to ignite fuel 804 at aperture 812 above flow straightening element 814 in chamber 806 to form flame 816. Carrier gas 808 can be air or another oxidant and can contain one or more inert gases, e.g., nitrogen, argon, etc. When fuel 804 contains sufficient oxidant for combustion, carrier gas 808 can be composed substantially of one or more inert gases. When fuel 804 does not contain sufficient oxidant for combustion, carrier gas 808 can contain an oxidant, e.g., oxygen.

As shown in FIG. 8, apparatus 800 further includes conduit 820 in fluid communication with atomizer 822 through port 824 for carrying an aerosol 826 to chamber 806 and through exit port 830 as particles 832. In this embodiment, conduit 820 is within conduit 802. As shown in this embodiment, port 828 of conduit 820 is flush with aperture 812 but it can be some distance above or below it.

By the configuration shown in this embodiment, aerosol 826 passes through flame 816 in to chamber 806. When aerosol 826 passes through flame 816 it is subject to the heat and to the combustion products produced in the flame. When fuel 804 and carrier gas 808 are rich in a hydrocarbon, the combustion products of the hydrocarbon includes carbon particles produced at flame 816 which can intimately and randomly mix with aerosol 826. Further under such conditions, chamber 806 is substantially free of oxidant because any oxidant, e.g., oxygen, is consumed during the combustion of the fuel. When aerosol 826 is introduced to chamber 806 under such conditions and is carried by a gas substantially free of oxidants, e.g., such as by a nitrogen stream or even a hydrocarbon stream, chamber 806 comprises a reducing environment for aerosol 826 because of the lack of oxygen and/or the availability of carbon which can react with oxidized components. The aerosol and any carbon particles produced by combustion of fuel 804 are carried down chamber 806 by carrier gas 808 to exit port 830 where the particles can be collected such as by filtration, impaction, electrophoresis, thermophoresis or deposited as a film on a substrate that can be used in a device. Further, aerosol 826 and particles formed therefrom can be heated by the combustion of fuel 804 and/or chamber 806 which can also be heated by the combustion of fuel 804 and/or an external heater not shown. Chamber 806 can be made of such a length so that aerosol 826 and particles formed therefrom and production products from the flame have a particular residence time in the environment of chamber 806 such as to anneal and/or reduce particles formed from aerosol 826. In one embodiment, chamber 806 is at least one meter in length.

Apparatus 800 can be made of any materials that do not substantially interfere with the operation of the apparatus or constituent parts. For example, conduit 820 can be made of glass or stainless steel, etc; conduit 802 and porous plug in aperture 812 can be made of aluminum, brass, steel, etc.; chamber 806 and ports 806, 810, 824 can be made of aluminum, steel, etc.

FIG. 9 is a top view of an apparatus for forming multicomponent materials. As shown in this illustration, apparatus 900 includes chamber 902, burner 904 and conduit port 906 which are in the shape of a slot, i.e., an elongated aperture. When in operation, burner 904 can produce a flame that is in the shape of a slot which can then impinge a carrier gas flowing through or around the slot flame. The slot flame can also be configured to impinge a substrate. In this embodiment, conduit port 906 is contained within burner 904 but it can be located outside burner 904. Conduit port 906 can be used to introduce an aerosol to chamber 902. Any of the forgoing illustrated apparatuses can have a chamber, burner, and/or atomizer in the shape of a slot. An advantage of a slot burner and/or chamber is that particles produced therefrom and therein can cover and deposit on to a larger area to make thin films of well mixed particles.

EXAMPLES

The following examples are intended to further illustrate certain preferred embodiments of the invention and are not limiting in nature. Those skilled in the art will recognize, or be able to ascertain, using no more than routine experimentation, numerous equivalents to the specific substances and procedures described herein.

In an example of forming multicomponent nanoparticle films, solid acid fuel cell anodes were produced on carbon substrates, such as Toray paper available from Fuel Cell Scientific, LLC. Such anodes comprise mixed nanoparticles films composed of solid acid nanoparticles, e.g., cesium dihydrogen phosphate (CDP), conductive nanoparticles, e.g. carbon nanoparticles (C), and electrocatalyst nanoparticles e.g., platinum nanoparticles (Pt).

Using an apparatus as illustrated in FIG. 1, a range of films having varying C/CDP/Pt mass ratios, CDP particle size, and total mass were formed. The features of these samples included: 1) films having well mixed particles, and 2) films having tunable grain sizes that can be fabricated with an average size of as small as about 10 nm and as large as about 500 nm. A sample electron micrograph image of a multicomponent C/CDP/Pt particle film is shown in FIG. 2. Example parameters used in the formation of such multicomponent films using an apparatus as illustrated in FIG. 1 are as follows. An aqueous CDP solution having a concentration of about 0.5 mg/mL was prepared by reacting cesium carbonate (available from Alfa Aesar) and ortho phosphoric acid (available from Alfa Aesar). The aqueous CDP solution was atomized in a first atomizer at a rate of about 0.4 mL/min. The resulting droplets were further fragmented in the hot gas from the heating column having a temperature of about 250 degrees Celsius. The resulting dry CDP particles had a mean diameter of roughly 50 nm.

A mixed suspension of about 40 nm acetylene black particles (Aldrich) and about 20 nm platinum particles (available from Alfa Aesar) was prepared in approximately 100% pure ethanol (available from Pharmco-Aaper, grade ACS/USP). The mass concentrations of carbon and platinum were about 0.5 mg/mL and 2.0 mg/mL, respectively. The suspension was atomized in a second atomizer at a rate of about 1 mL/min. After about a 10 minute deposition onto a 1 inch diameter piece of carbon filter, the resulting dark, fluffy, uniform film weighed about 3.2 mg. Energy-dispersive X-ray analysis of the film yield a carbon/CDP/platinum mass ration of about 2/3/3.

The first and second atomizers used in the previous example were made from a drug delivery system for asthma, available from Southeast Medical Supply, that were modified to increase the liquid reservoir volume and supply gas pressure. The atomizers were modified by cutting and drilling holes into the body of the liquid reservoir and fitting tubing on the inlet and outlet of the reservoir. The entire assembly was subsequently placed into a larger glass reservoir fitted with flow feedthroughs for the inlet and outlet. The larger reservoir was filled with the solution or suspension to be atomized, and the holes cut into the original reservoir allowed the liquid to pass into the atomization region. These modifications allowed for a larger volume of liquid to be atomized.

Using an apparatus as illustrated in FIG. 3, additional multicomponent particle films were prepared. For example, solid acid CDP particles were produced by solution atomization of a CDP/water solution having a concentration of about 0.5 mg/mL which was prepared by combining cesium carbonate (available from Alfa Aesar) and orthophosphoric acid (available from Alfa Aesar). The CDP water solution was atomized with the custom atomizer described in the previous example. Platinum (Pt) nanoparticles having a diameter of about 20 nm were aerosolized by atomizing a suspension of Pt powder in ethanol using a Model 3076 solution atomizer available from TSI, Inc. The aerosols from the atomization of CDP/water solution and platinum suspension was combined and dried with heat from a lean premixed flame. The lean premixed flame was formed by combusting a mixture of ethylene and air at an equivalence ratio of less than unity. The aerosolized components were mixed in the gas phase and then collected onto a carbon filter.

In a separate sample preparation, carbon nanoparticles were combined with the CDP and Pt aerosols prepared in the previous example. The carbon particles were formed with a Bunsen burner by making the Bunsen burner combust a fuel that was more rich in hydrocarbon by igniting a hydrocarbon rich mixture of ethylene, oxygen, and argon. The Bunsen burner thus produced carbon particles that were combined with CDP and Pt particles from the two atomizers in the apparatus. The Bunsen burner in this example thus served the dual purpose of drying the atomized droplets of the CDP solution and Pt suspension, and forming the carbon particles.

Example parameters used in the formation of a multicomponent C/CDP/Pt film using an apparatus as illustrated in FIG. 3 are as follows. An aqueous CDP solution having a concentration of 4 mg/mL was atomized in at a rate of 0.4 mL/min, forming CDP particles having a mean diameter of roughly 200 nm. A suspension of about 20 nm platinum particles in ethanol having a mass concentration of about 1.3 mg/mL was atomized in at a rate of about 0.2 mL/min. The flame was produced from a premixed flow of about 0.2 L/min of ethylene and about 1.4 L/min of air. After a 1 hour deposition onto a 1 inch diameter piece of carbon filter, the resulting film was a well-mixed black, fluffy film that weighed about 100 mg. The components weighed as follows: about 41 mg of carbon; about 50 mg of CDP; and about 9 mg of platinum.

Using an apparatus as illustrated in FIG. 4, a multicomponent nanoparticle film of titania and carbon was prepared. In this example, titania particles having an average size of about 10 nm were produced in stagnation flame 412 from burner 410 by injecting and vaporizing titanium isopropoxide (available from Alfa-Aesar) into the combustible ethylene/oxygen/argon mixture by use of a syringe pump through a needle. Carbon particles 404 having an average agglomerate size of about 50 nm were produced from burner 402 from a flame by combusting an ethylene/air mixture having an equivalence ratio of greater than 1.8. The multicomponent nanoparticle film of titania and carbon was produced on a glass substrate fixed to rotating plate 406. As shown in the electron micrograph image of FIG. 5, the multicomponent film is a well-mixed film composed of titania and carbon nanoparticles.

FIG. 7 illustrates the distribution of a mixed aerosol containing carbon and CDP particles. The carbon particles were formed by a fuel-rich premixed ethylene/oxygen flame having an equivalence ratio of 2.0. The CDP particles were formed by solution atomization, wherein a 0.5 mg/mL aqueous CDP solution was atomized, and the resulting aerosolized droplets mixed with the hot gas (about 250 degrees Celsius) containing the carbon particles formed in the flame. The particle size distribution was determined by a scanning mobility particle sizer (nano-SMPS analyzer model 3936N25, available from TSI, Inc. As shows in the figure, the flame-generated carbon particles exhibit a large peak near about 10 nm and the CDP particles exhibit a smaller broader peak near about 50 nm.

Using an apparatus as illustrated in FIG. 8, a composite comprising a plurality of lithium iron phosphate particles and a plurality of carbon was prepared. The composite was prepared by combining an aerosol of lithium iron phosphate nanoparticles with an aerosol of carbon particles in a chamber having a reducing environment.

Initially, an acidic aqueous precursor solution was prepared by combining about 3.69 g of $Li_2CO_3$ (available from Alfa Aesar) with 19.28 g of $FeCl_2(4H_2O)$ (available from Alfa Aesar) with 7 mL of $H_3PO_4$ (available from Alfa Aesar) with 200 mL of distilled water. The pH of the solution was adjusted by adding 5 mL of HCl.

The precursor solution was atomized in the atomizer at a rate of about 0.1 mL/min with a stream of nitrogen gas. The atomizer that was used in this experiment was a TSI Model 3076 atomizer which provided aerosolized droplets of approximately 4 microns. Carbon particles were produced by combusting a mixture comprising propane and air at a ratio of about 1:22 by volume.

The aerosolized precursor solution was passed through the flame used to produce the carbon particles causing a further reduction in the size of the of the aerosol and subsequently produced lithium iron phosphate particles possibly due to microexplosion of the droplets as they entered the flame forming smaller satellite droplets, and drying of the satellite droplets.

The dried lithium iron phosphate/carbon aerosol mixture was carried through a conduit under temperatures exceeding 200 C due to the heat produced by the flame. The heat combined with the carbon-rich and oxygen-deficient environment provides a reducing environment for minimizing the presence of Fe(III). The HCl acid added to the solution remained in the gas phase and was carried out of the system with the flow.

The multicomponent aerosol itself may be collected by impaction, interception, diffusion, electrostatic precipitation, or thermophoresis. A simple way to collect the aerosol particles is to pass the flow through a carbon filter, which itself may serve as a lithium ion battery cathode. In this way, the lithium iron phosphate and carbon nanoparticle production, mixing, and collection onto a battery electrode is accomplished in a single process.

Only the preferred embodiments of the present invention and examples of its versatility are shown and described in the present disclosure. It is to be understood that the present invention is capable of use in various other combinations and environments and is capable of changes or modifications within the scope of the inventive concept as expressed herein. Thus, for example, those skilled in the art will recognize, or be able to ascertain, using no more than routine experimentation, numerous equivalents to the specific substances, procedures and arrangements described herein. Such equivalents are considered to be within the scope of this invention, and are covered by the following claims.

What is claimed is:

1. A process of forming a composite, the process comprising: forming a first aerosol of lithium active compound particles; forming a second aerosol of carbon particles; and combining the first aerosol with the second aerosol in a reducing environment to form a composite comprising the lithium active compound particles and carbon particles.

2. The process according to claim 1, wherein the lithium active compound particles and carbon particles have an average size of less than 500 nm.

3. The process according to claim 1, wherein the wherein the lithium active compound particles and carbon particles have an average size of less than 200 nm.

4. The process according to claim 1, wherein the first aerosol of lithium active compound particles is an aerosol of lithium iron phosphate or precursor thereof.

5. The process according to claim 4, wherein the first aerosol of lithium iron phosphate particles or precursor thereof is passed through a flame produced by the combustion of a hydrocarbon and oxidant which is used to form the second aerosol of carbon particles.

6. The process according to claim 1, wherein the second aerosol of carbon particles is formed by the combustion of a hydrocarbon with an oxidant.

7. The process according to claim 1, further comprising adding a dopant to the composite.

8. The process according to claim 1, wherein the second aerosol of carbon is formed by combusting a fuel rich in hydrocarbon relative to an oxidant to produce the reducing environment and subjecting the first aerosol of lithium active compound particles to the reducing environment.

9. A process of forming a composite material, the process comprising: forming a first aerosol of a lithium active compound; forming a second aerosol of carbon; and combining the first aerosol and second aerosol to form a composite material comprising the lithium active compound and carbon; wherein the second aerosol of carbon is formed by combusting a fuel rich in hydrocarbon relative to an oxidant to produce an oxidant deficient environment and subjecting the first aerosol of lithium active compound to the oxidant deficient environment.

10. The process according to claim 9, wherein the first aerosol is an aerosol of lithium iron phosphate or precursor thereof.

11. The process according to claim 9, wherein the lithium active compound is in an aqueous medium and the first aerosol is formed from the aqueous medium of the lithium active compound.

12. The process according to claim 9, wherein the lithium active compound is formed from any one of lithium acetate, lithium hydroxide, lithium nitrate, lithium oxalate, lithium oxide, lithium phosphate, lithium dihydrogen phosphate, lithium carbonate, iron sulfate, iron acetate, iron oxalate, iron citrate, or iron chloride.

* * * * *